United States Patent
Yang et al.

(10) Patent No.: US 9,224,420 B1
(45) Date of Patent: Dec. 29, 2015

(54) SYNCMARK DETECTION FAILURE RECOVERY SYSTEM

(71) Applicant: Avago Technologies General IP (Singapore) Pte. Ltd., Singapore (SG)

(72) Inventors: Yuqing Yang, Shanghai (CN); Shaohua Yang, San Jose, CA (US); Lei Wang, Shanghai (CN); Xiao Jun Wang, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/505,479

(22) Filed: Oct. 2, 2014

(51) Int. Cl.
| G11B 20/10 | (2006.01) |
| G06F 11/10 | (2006.01) |
| G11B 20/12 | (2006.01) |
| G11B 5/596 | (2006.01) |

(52) U.S. Cl.
CPC ...... *G11B 20/10222* (2013.01); *G06F 11/1076* (2013.01); *G11B 5/59655* (2013.01); *G11B 20/10009* (2013.01); *G11B 20/10037* (2013.01); *G11B 20/1252* (2013.01); *G11B 2020/1241* (2013.01); *G11B 2020/1287* (2013.01)

(58) Field of Classification Search
CPC .............. G11B 20/10296; G11B 2220/2516; G11B 27/36; G11B 20/10222; G11B 20/10009; G11B 20/10027; G11B 5/59655; G11B 5/09; G11B 5/59616; G11B 20/10037; G11B 20/1252; G11B 2020/1287; G06F 11/1076
USPC ................... 360/51, 31, 39, 42, 55
See application file for complete search history.

(56) References Cited

U.S. PATENT DOCUMENTS

| 4,777,544 | A | 10/1988 | Brown et al. |
| 5,130,866 | A | 7/1992 | Klaassen et al. |
| 5,237,325 | A | 8/1993 | Klein et al. |
| 5,278,703 | A | 1/1994 | Rub et al. |
| 5,309,357 | A | 5/1994 | Stark et al. |
| 5,341,249 | A | 8/1994 | Abbott et al. |
| 5,377,058 | A | 12/1994 | Good et al. |
| 5,521,948 | A | 5/1996 | Takeuchi |
| 5,523,902 | A | 6/1996 | Pederson |

(Continued)

FOREIGN PATENT DOCUMENTS

| FR | 2904168 A1 | 1/2008 |
| WO | WO 03/047091 | 6/2003 |
| WO | WO 2008/09620 | 1/2008 |

OTHER PUBLICATIONS

U.S. Appl. No. 13/529,572, filed Jun. 21, 2012, Yang et al.

(Continued)

*Primary Examiner* — Ali Neyzari

(57) ABSTRACT

An apparatus for finding a syncmark in a data sector includes a syncmark detection circuit, decoder, fragment information table and syncmark recovery circuit. The syncmark detection circuit is operable to detect a syncmark in each of a number of fragments of the data sector and to compute a syncmark quality for each of the syncmarks. The decoder is operable to apply a data decoding algorithm to encoded data for the data sector. The encoded data has start points identified by the syncmark in each of the fragments. The fragment information table stores the syncmark quality for each of the syncmarks. The syncmark recovery sweeps the start points over search ranges for selected fragments for which the syncmark detection circuit failed to detect the syncmark and which have a lower syncmark quality than others of the fragments.

20 Claims, 3 Drawing Sheets

(56) References Cited

U.S. PATENT DOCUMENTS

| | | | |
|---|---|---|---|
| 5,594,341 A | 1/1997 | Majidi-Ahy |
| 5,668,679 A | 9/1997 | Swearingen et al. |
| 5,696,639 A | 12/1997 | Spurbeck et al. |
| 5,768,044 A | 6/1998 | Hetzler et al. |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang et al. |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,476,989 B1 | 11/2002 | Chainer |
| 6,490,110 B2 | 12/2002 | Reed et al. |
| 6,493,162 B1 | 12/2002 | Fredrickson |
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,671,404 B1 | 12/2003 | Kawatani |
| 6,717,764 B2 | 4/2004 | Lake |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,826,245 B1 | 11/2004 | Brown et al. |
| 6,839,014 B2 | 1/2005 | Uda |
| 6,856,183 B2 | 2/2005 | Annampedu |
| 6,865,040 B2 | 3/2005 | Fayeulle et al. |
| 6,876,511 B2 | 4/2005 | Koyanagi |
| 6,906,990 B2 | 6/2005 | Nagata et al. |
| 6,912,099 B2 | 6/2005 | Annampedu et al. |
| 6,963,521 B2 | 11/2005 | Hayashi |
| 6,980,382 B2 | 12/2005 | Hirano et al. |
| 6,999,257 B2 | 2/2006 | Takeo |
| 6,999,264 B2 | 2/2006 | Ehrlich |
| 6,999,404 B2 | 2/2006 | Furumiya et al. |
| 7,002,767 B2 | 2/2006 | Annampedu et al. |
| 7,016,131 B2 | 3/2006 | Liu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,133,227 B2 | 11/2006 | Chiang |
| 7,136,250 B1 | 11/2006 | Wu et al. |
| 7,154,689 B1 | 12/2006 | Shepherd et al. |
| 7,158,464 B2 | 1/2007 | Gushima et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,203,015 B2 | 4/2007 | Sakai et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,394,608 B2 | 7/2008 | Eleftheriou et al. |
| 7,411,531 B2 | 8/2008 | Aziz et al. |
| 7,420,498 B2 | 9/2008 | Barrenscheen |
| 7,446,690 B2 | 11/2008 | Kao |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,567 B2 | 10/2009 | Park et al. |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 7,643,235 B2 | 1/2010 | Erden et al. |
| 7,656,982 B2 | 2/2010 | Gaedke |
| 7,663,831 B2 | 2/2010 | Hayashi et al. |
| 7,679,850 B2 | 3/2010 | Smith |
| 7,693,243 B2 | 4/2010 | Chen et al. |
| 7,768,730 B2 | 8/2010 | Bliss et al. |
| 7,796,480 B2 | 9/2010 | Cheng et al. |
| 7,835,104 B2 | 11/2010 | Yamashita |
| 7,889,823 B2 | 2/2011 | Yang |
| 8,102,960 B2 | 1/2012 | Ran et al. |
| 8,107,573 B2 | 1/2012 | Chang |
| 8,169,726 B2 | 5/2012 | Wilson |
| 8,531,933 B2 | 9/2013 | Malki |
| 8,576,969 B1 | 11/2013 | Xie et al. |
| 8,699,164 B1 * | 4/2014 | Ying ................ G11B 20/10222 360/42 |
| 9,001,445 B1 * | 4/2015 | Cao .................... G11B 5/59655 360/39 |
| 9,025,265 B1 * | 5/2015 | Dziak ................... G11B 27/36 360/31 |
| 2002/0150179 A1 | 10/2002 | Leis et al. |
| 2005/0243455 A1 | 11/2005 | Annampedu |
| 2007/0104300 A1 | 5/2007 | Esumi et al. |
| 2008/0056403 A1 | 3/2008 | Wilson |
| 2009/0142620 A1 | 6/2009 | Yamamoto et al. |
| 2009/0274247 A1 | 11/2009 | Galbraith et al. |
| 2015/0228304 A1 * | 8/2015 | Yang ................ G11B 20/10296 360/51 |

OTHER PUBLICATIONS

Annampedu, V. et al "Adaptive Algorithms for Asynchronous Detection of Coded Servo Signals Based on Interpolation", IEEE Transactions on Magnetics, vol. 41, No. 10, Nov. 2005.

Aziz et al., "Asynchronous Maximum Likelihood (ML) Detection of Servo Repeatable Run Out (RRO) Data", Digest, IEEE Intl Mag Conf, vol. 42, No. 10, pp. 2585-2587 (Oct. 2006).

Aziz et al., "Interpolation Based Maximum-Likelihood(ML) Detection of Asynchronous Servo Repeatable Run Out (RRO) Data" IEEE Intl Mag Conf. vol. 42 No. 10 pp. 2585-2587, Oct. 2006.

Hagenauer et al., "A Viterbi algorithm with soft-decision outputs and its applications," in Proc. IEEE Global Telecom Conf 1989, Dallas, Texas, pp. 1680-1686 (Nov. 1989).

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

Weller et al "Thermal Limits in Ultrahigh-density Magnetic Recording" IEEE Trans. Magn. vol. 35, No. 6, p. 4423, Nov. 1999.

* cited by examiner

SYNCMARK DETECTION FAILURE RECOVERY SYSTEM

FIELD OF THE INVENTION

Various embodiments of the present invention provide systems and methods for recovering from a failure to locate a syncmark in multiple fragments of a data sector.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of the start of user data is detected using syncmarks stored on the storage medium.

SUMMARY

Various embodiments of the present invention provide systems, apparatuses and methods for recovering from a failure to locate a syncmark in multiple fragments of a data sector.

In some embodiments, an apparatus for finding a syncmark in a data sector includes a syncmark detection circuit, decoder, fragment information table and syncmark recovery circuit. The syncmark detection circuit is operable to detect a syncmark in each of a number of fragments of the data sector and to compute a syncmark quality for each of the syncmarks. The decoder is operable to apply a data decoding algorithm to encoded data for the data sector. The encoded data has start points identified by the syncmark in each of the fragments. The fragment information table stores the syncmark quality for each of the syncmarks. The syncmark recovery sweeps the start points over search ranges for selected fragments for which the syncmark detection circuit failed to detect the syncmark and which have a lower syncmark quality than others of the fragments.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

In hard disk drive applications, higher storage density is achieved at the cost of weaker signals and stronger distortion. This results in a greater possibility of failed syncmark detection due to the defect or distortion. To recover the data in a sector for which one or more syncmarks could not be detected, the syncmark detection failure recovery system disclosed herein enables bit or symbol synchronization, identifying the data shift for one or more fragments in the data sector that allow the data to be successfully recovered or processed.

In some embodiments, data is organized in a data sector or other data block including multiple fragments, each with at least one syncmark, a known data pattern that a syncmark detector attempts to locate during normal processing to mark the start of user data. If the detector fails to locate one or more of the syncmarks in a data sector, a syncmark detection failure recovery circuit and process can be triggered to locate the start of user data in the fragments for which the syncmarks were not found, referred to herein as missing syncmarks. In some embodiments, this is also referred to as No Syncmark Recovery. During the recovery process, a search is implemented, shifting the data samples corresponding to the fragments while attempting to process the data samples. The shift values at which the data samples can be successfully processed are stored, identifying the start of user data in the fragments. These shift locations are also referred to herein as forced syncmark locations, recorded in a Fragment Information Table. In some embodiments, the search is started at the shift positions that correspond to the most likely location of the syncmarks in the fragments for which syncmark detection failed. IN some embodiments, the search is implemented for fragments in the data sector for which the syncmark detector reports the lowest syncmark detection quality metric, or for which the syncmark detection quality metric falls below a threshold. The search range can be narrowed using an estimation of the syncmark location from nearby fragments. The search for syncmark location in multiple fragments can further be facilitated using a helical sweeping algorithm from the most likely syncmark locations to reduce the time complexity and accelerate data convergence.

Figure 1:
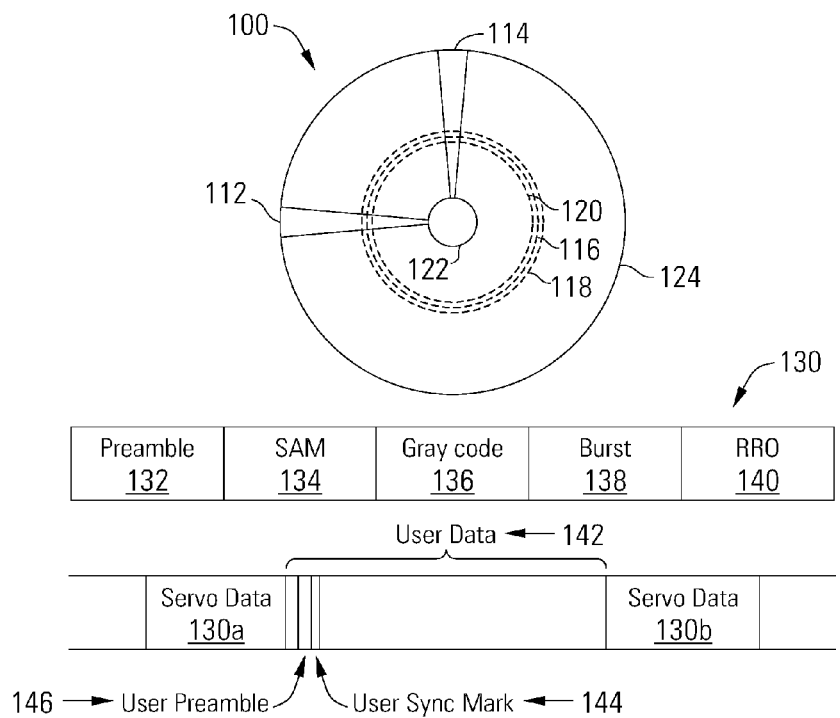
FIG. 1 is a diagram of a magnetic storage medium and sector data scheme that may be used with a syncmark detector with accelerated searching for multiple missing syncmarks in multiple fragments of a data sector in accordance with some embodiments of the present invention.

Turning to FIG. 1, a magnetic storage medium 100 is shown with an example data track 116 and its two adjacent neighboring data tracks 118, 120, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information or syncmarks, identifying the location of user data fragments within the user data region 142. A number of user data fragments combine to form a data sector.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user syncmark 144 and a user preamble 146. As used herein, the phrase "syncmark" is used in its broadest sense to mean any pattern that may be used to establish a point of reference.

Figure 2:
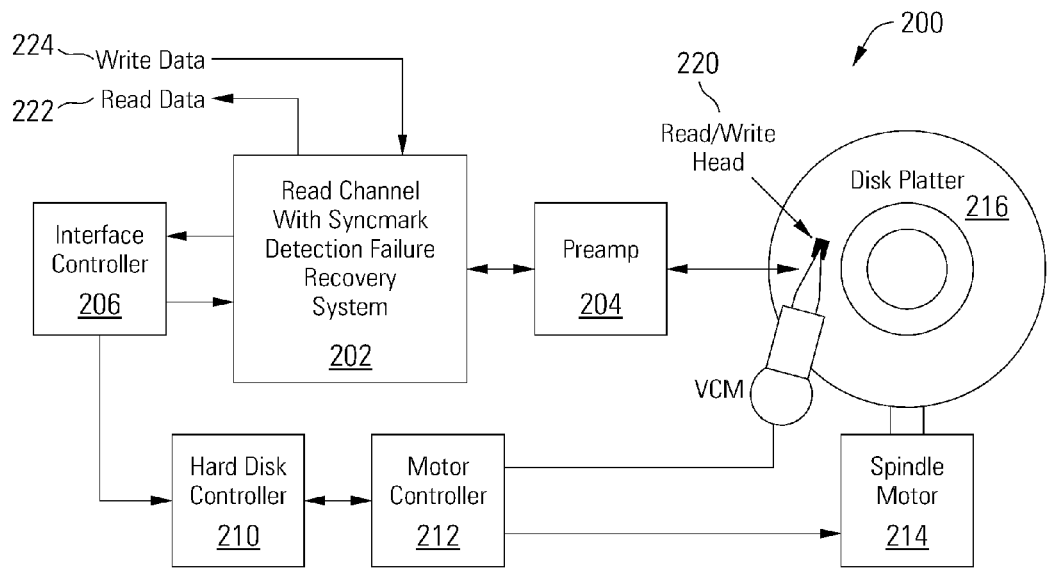
FIG. 2 depicts a storage system including a read channel with a syncmark detector with accelerated searching for multiple missing syncmarks in accordance with some embodiments of the present invention.

Turning to FIG. 2, a storage system 200 is disclosed which includes a read channel circuit 202 with a syncmark detection failure recovery system which determines the start location of user data in data fragments after syncmark detection failure in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210.

Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. During read operations, a syncmark detector in read channel circuit 202 searches for syncmarks in data fragments. If one or more syncmarks are not found, a syncmark detection failure recovery system searches for the start of user data in the data fragments of a data sector which were not found.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
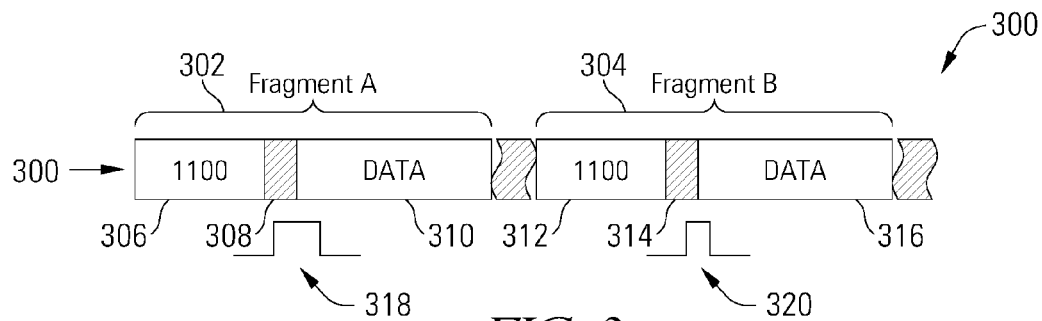
FIG. 3 depicts several fragments and their syncmarks in a data sector in accordance with some embodiments of the present invention.

Turning to FIG. 3, several data fragments 302, 304 and their syncmarks 308, 314 in a data sector 300 are depicted in accordance with some embodiments of the present invention. Each fragment 302, 304 may include a preamble 306, 312, a syncmark 308, 314, and user data 310, 316, and may also include other fields. The syncmarks 308, 314 indicate the location of the user data 310, 316. If one or both the syncmarks 308, 314 are not found by the syncmark detector circuit in the normal course of data processing, there may be a number of possible locations 318, 320 to be tested as the start of the user data 310, 316. As a result, a brute force search of all the possible combinations for syncmarks (e.g., 308, 314) over multiple fragments (e.g., 302, 304) rapidly becomes cumbersome and slow, particularly when the number of fragments in a data sector is large.

The syncmark detection failure recovery system uses one or more of a number of techniques to facilitate locating the start of user data in fragments for which the syncmarks could not be reliably detected or detected with confidence. The fragments for which the syncmark detector reported a low quality of detection are included first in the failure recovery search, for example by including all those fragments in a data sector having a syncmark detector quality metric below a threshold. In other words, the syncmark detection failure recovery system searches the worst fragments first in some embodiments. The syncmark detection failure recovery system sweeps through the possible locations for the start of user data in the selected fragments, starting with the most likely positions first. The most likely starting positions for the search are calculated in some embodiments based on syncmark locations in nearby fragments, or nearby data sectors. In other embodiments, the most likely starting positions for the search are calculated based on other indicators, such as an end of fragment syncmark.

The search is performed by adjusting the starting location of user data in the selected fragments and performing other data processing that indicates whether the data was successfully read, for example by applying a data detection algorithm and/or a data decoding algorithm. If the data can be successfully performed with a particular shift or offset establishing the starting location of user data, that shift value or forced syncmark is recorded, indicating the actual start of the user data.

Figure 4:
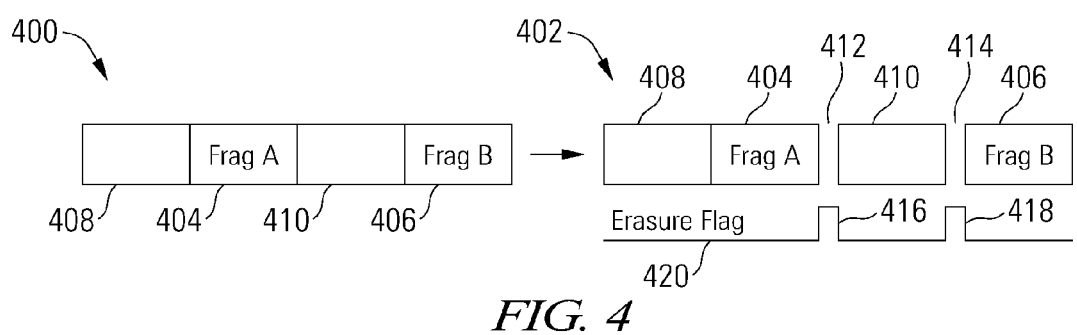
FIG. 4 depicts several fragments assembled together in a data sector and for missed syncmark recovery and data detection in accordance with some embodiments of the present invention.

The syncmark detection failure recovery system is independent of the data storage for the sector in some embodiments. Turning to FIG. 4, several fragments are depicted as assembled together in a data sector and as collected for syncmark detection failure recovery and data detection in accordance with some embodiments of the present invention. On the left 400, Y samples or digital samples for a number of fragments 404, 406, 408, 410 are depicted as they are collected in some embodiments to perform syncmark detection failure recovery or no syncmark recovery. The fragments are thus stitched together as they form a logic sector. On the right 402, the fragments 404, 406, 408, 410 are depicted as they are collected for data detection or other data processing, showing data holes 412, 414 resulting from shifting of the data for fragments during syncmark detection failure recovery. An erasure flag 420 is asserted in some embodiments at times 416, 418 during data holes 412, 414. The storage of a logic sector for syncmark detection failure recovery in the same format 400 as the format 402 for data detection or other subsequent data processing is enabled in some embodiments using control status and syncmark related information stored in a memory, referred to herein as a Fragment Information Table. By maintaining the same data format for syncmark detection failure recovery as for other processing functions, syncmark detection failure recovery can be combined with other retry functions when normal data processing fails.

Figure 5:
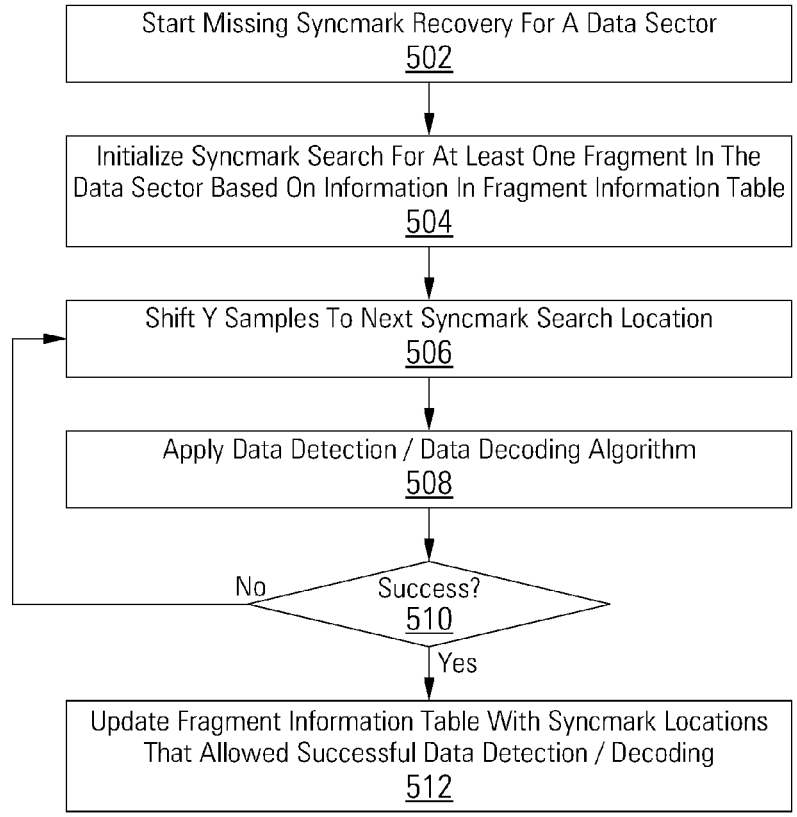
FIG. 5 is a flow diagram showing a method for recovering the position of syncmarks in a data sector after failure to locate syncmarks in accordance with some embodiments of the present invention.

Turning to FIG. 5, a flow diagram 500 depicts a method for recovering the position of syncmarks in a data sector after failure to locate syncmarks in accordance with some embodiments of the present invention. The syncmark detection failure recovery is initiated when the syncmark for one or more fragments in a data sector is not found or when the quality metric associated with the syncmark detection is below a threshold. (Block 502) Syncmark detection can be performed in any suitable manner. In some embodiments, the Euclidean distance or Hamming distance is calculated between the actual data pattern for the syncmark being sought and the current group of bits or symbols within a sliding window over the input data samples. In some of these embodiments, the data position with the lowest resulting distance is used as the position of the syncmark, and a quality metric is also generated based on the distance to indicate whether the syncmark was found in the input data samples. If there is no error or distortion of the syncmark in the input data samples, the ideal distance between the data samples and the syncmark pattern would be zero, and a high quality metric would be output along with the position to indicate that the syncmark was detected at the specified position. Based upon the disclosure provided herein, one of ordinary skill in the art will recognize a variety of syncmark detection algorithms and circuits that can be used to detect syncmarks in digital data samples. Furthermore, although some embodiments disclosed herein refer to quality metrics below a threshold as having the worst syncmark quality, it is equivalent to generate quality metrics that are inversely proportional to detection confidence, and to select as the worst syncmarks those with a quality metric above a threshold.

The syncmark search is initialized based on information in the Fragment Information Table. (Block 504) This can include selecting the fragments in which to search for syncmarks, based on the quality metric for the previous syncmark detection process, for example selecting fragments based on comparison of their syncmark quality metrics with a threshold. This can also include specifying the search windows within which the syncmarks might be found. This can also include the most likely syncmark locations to be used as the starting position of the search, for example based on syncmark locations in nearby fragments and sectors, or based on other types of syncmarks such as end of fragment syncmarks.

The digital data samples for the selected fragments are shifted to the next syncmark search location. (Block 506) Initially, the data is shifted to the most likely position for the syncmark or the corresponding start of user data. As the search progresses, the data is shifted to other positions within the search window. In some embodiments, the digital data samples comprise equalized data samples or Y samples, although the syncmark detection failure recovery is not limited to any particular format of digital data or to data that has been previously processed in any particular manner.

The data samples for the sector, with the selected fragments having been shifted based on the current search locations, is processed. (Block 508) If the data processing can be performed successfully, the current shift values are considered to be the correct forced syncmark locations. In some embodiments, the data processing comprises applying a data detection algorithm to the data samples for the sector, such as, but not limited to, a Viterbi algorithm data detector circuit, or a maximum a posteriori (MAP) data detector circuit as are known in the art. In some embodiments, the data processing comprises applying a data decoding algorithm to the data samples for the sector or to detected values for the sector, such as, but not limited to, a low density parity check decoder circuit as is known in the art. If the data sector converges in the low density parity check decoder circuit with the shifted selected fragments, the forced syncmark locations are considered to have been correctly identified.

Thus, a determination is made as to whether the data is successfully processed for current shift values. (Block 510) If not, and if the search windows have not been completely searched, the search continues by shifting the data samples to the next syncmark search locations. (Block 506) If the data is successfully processed, the forced syncmark locations are considered to have been correctly identified and the Fragment Information Table is updated with the shift values that allowed the successful processing. (Block 512) The stored shift values can be used to identify the starting search position for missing syncmarks in other nearby fragments and sectors.

Figure 6:
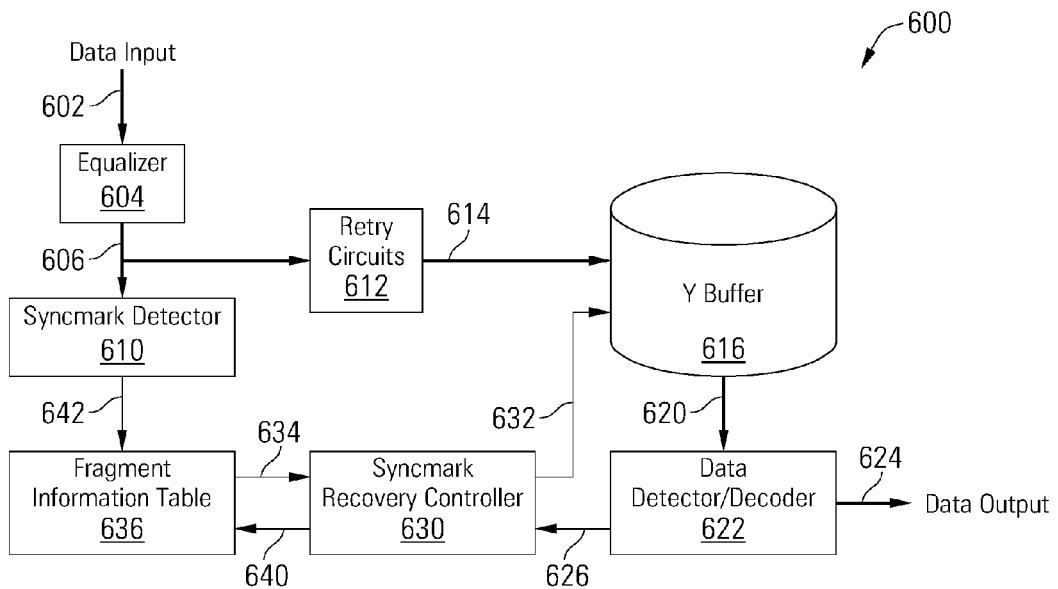
FIG. 6 depicts a data processing circuit with a syncmark detector with accelerated searching for multiple missing syncmarks in accordance with some embodiments of the present invention.

Turning to FIG. 6, a data processing circuit 600 is depicted with a no syncmark recovery circuit in accordance with some embodiments of the present invention. The no syncmark recovery circuit comprises a syncmark recovery controller 630 operable to control the search for low quality syncmarks (and thus, the corresponding start positions of user data). The no syncmark recovery circuit also comprises a memory or Fragment Information Table 636 which stores information used to identify low quality syncmarks, establish the starting search positions and search window size.

Digital data for a data sector is received at a data input 602, for example from an analog to digital converter. The digital data at data input 602 can be derived from any suitable source, such as, but not limited to, a read head in a magnetic disk drive. In some embodiments, an equalizer 604 applies an equalization algorithm to digital data at data input 602 to yield equalized data 606 or Y samples. In some embodiments of the present invention, equalizer 604 is a digital finite impulse response filter circuit as is known in the art. However, other embodiments omit the equalizer and the syncmark detection failure recovery is applied digital data samples or X samples from an analog to digital converter. The syncmark detection failure recovery is not limited to use with any particular format of digital data or to data that has been previously processed in any particular manner.

The syncmark detection failure recovery can be used in combination with other retry circuits 612, such as, but not limited to, data sample averaging or X averaging, inter-track interference cancellation, or other algorithms applied in a retry read operation after a normal read operation fails to recover the stored data sector correctly. This combination is enabled by performing the syncmark detection failure recovery on fragments that have been assembled in a logic data sector in the same format that other retry processing is applied, as well as subsequent processing of the data sector such as data detection and/or data decoding. Data 614 from retry circuits 612 (or, in other embodiments, from an analog to digital converter or equalizer 604) is stored in a memory or Y buffer 616. Again, the fragments in the data sector are stored in the Y buffer 616 as they are stitched together to form the logic data sector, rather than fragment by fragment in different locations for separate syncmark recovery.

During a syncmark detection failure recovery operation, data for selected fragments with low syncmark quality is shifted based on shift values 632 specified by the syncmark recovery controller 630. The resulting data sector with shifted fragments 620 is provided to a data detector and decoder 622 or other subsequent data processing circuits, which determine whether the data sector with shifted fragments 620 has been correctly assembled. Again, the data detector and decoder 622 can comprise, but is not limited to, a Viterbi algorithm data detector circuit, or a maximum a posteriori (MAP) data detector circuit and a low density parity check decoder or Reed-Solomon decoder. Such a data detector and decoder 622 processes the data sector with shifted fragments 620 in iterative fashion in some embodiments, and can apply other retry operations as desired in an attempt to correctly determine the values and to perform error correction decoding of the data sector with shifted fragments 620. When the data sector with fragments shifted in the syncmark detection failure recovery operation has been successfully processed, the resulting data for the sector is yielded at data output 624.

The data stream set forth above including data input 602, equalized data 606, data 614 from retry circuits 612, the data sector with shifted fragments 620 from Y buffer 616, and data output 624 is shown with thick lines in FIG. 6 and is decoupled from control information, shown with thinner lines in FIG. 6.

A syncmark detector 610 searches for a syncmark in the equalized data 606 or Y samples for each fragment in a sector and yields a detected syncmark location and quality 642. The detected syncmark location and quality 642 are stored in the Fragment Information Table 636. The syncmark detector 610 can be any circuit suitable for determining whether a syncmark pattern exists in the Y samples 606, such as, but not limited to, a Euclidean or Hamming distance calculator operable to calculate the distance between the syncmark pattern and the bits or symbols in a sliding window over the Y samples 606. In some embodiments, the syncmark detector 610 comprises a cross-correlation calculator which calculates the cross-correlations of the Y samples 606 within the sliding window with the syncmark pattern. The cross-correlation calculator provides the cross-correlation values to a maximum detector, which finds the maximum cross-correlation value for the syncmark pattern for use in generating the quality metric, as well as the index within the Y samples 606 of the maximum cross-correlation value. Because the Y samples 606 may be noisy, the syncmark in the Y samples 606 may have errors. Furthermore, other data patterns in the Y samples 606 may resemble the syncmark pattern if corrupted by errors. Thus, the quality metric reports the likelihood that any detected syncmark is the actual syncmark. Based upon the disclosure provided herein, one of ordinary skill in the art will recognize a variety of syncmark detector circuits suitable for locating a syncmark in a data stream and for generating a quality metric indicating the likelihood that the syncmark was actually found.

The syncmark recovery controller 630 receives a convergence status 626 from the data detector and decoder 622. The convergence status 626 indicates whether processing of the data sector with shifted fragments 620 was successfully processed in data detector and decoder 622, meaning that the correct values of the data sector could be determined with the selected fragments shifted according to the shift values 632 specified by the syncmark recovery controller 630. If the data sector with shifted fragments 620 can be successfully processed in data detector and decoder 622, it is assumed that the shift values 632 specified by the syncmark recovery controller 630 and those shift values 632 are stored in the Fragment Information Table 636 as forced syncmark locations 640. At the beginning of a syncmark detection failure recovery operation, the syncmark recovery controller 630 retrieves syncmark information 634 from the Fragment Information Table 636. The syncmark information 634 includes syncmark quality for each fragment in the sector, enabling the syncmark recovery controller 630 to compare the syncmark quality metrics with a threshold to select the worst fragments in the sector to include in the search. The syncmark information 634 also includes syncmark locations for nearby fragments and sectors, enabling the syncmark recovery controller 630 to determine the most likely location for the syncmark in each selected fragment. The syncmark information 634 can also include a search window size defining the range of shift values that can be applied to a fragment in search of the syncmark.

The Fragment Information Table 636 thus stores information about each data fragment including syncmark detection information from the syncmark detector 610 including syncmark location and quality, forced syncmark location in fragments for which the syncmark is missing, in other words which had a quality metric below a threshold. The Fragment Information Table 636 also stores the convergence status from the data detector and decoder 622 for each fragment. The Fragment Information Table 636 also stores configuration information for the syncmark detection failure recovery, such as, but not limited to search window size, quality metric threshold, data shift granularity, etc. The Fragment Information Table 636 is updated when data is available at data input 602, for example upon a physical read of a storage medium, when the syncmark detector 610 searches the fragments in the sector for the syncmarks. The Fragment Information Table 636 is also updated during the syncmark detection failure recovery, for example when the data sector with shifted fragments 620 is successfully processed in data detector and decoder 622 and the shift values 632 specified by the syncmark recovery controller 630 that resulted in the successful processing are stored in the Fragment Information Table 636 as forced syncmark locations 640.

In some embodiments, the initial search locations, or most likely location for the syncmark in each selected fragment, are calculated based on a measurement ACQ2SM between an ACQ signal asserted when a data fragment has been read from the storage medium and the detection with high likelihood of a syncmark by the syncmark detector 610. A threshold can be used to identify fragments for which the syncmark is detected by the syncmark detector 610 with high likelihood. The ACQ2SM measurements for fragments with high quality syncmark detection are averaged in a moving window and stored in the Fragment Information Table 636. When beginning a syncmark detection failure recovery operation, the syncmark recovery controller 630 retrieves the stored ACQ2SM measurements from the Fragment Information Table 636 for nearby fragments and uses the average ACQ2SM distance for the nearby fragments as the starting search location for the selected fragment. During operation the syncmark recovery controller 630 then causes the Y buffer 616 to apply a shift to the selected fragment causing the user data in the fragment to begin at the starting search location. If the convergence status 626 after processing of the sector with that shift value by the data detector and decoder 622 reports a failure, the syncmark recovery controller 630 adjusts the shift value and repeats the processing in the data detector and decoder 622 until the processing succeeds or until all shift values within the search window have been unsuccessfully tried.

Figure 7:
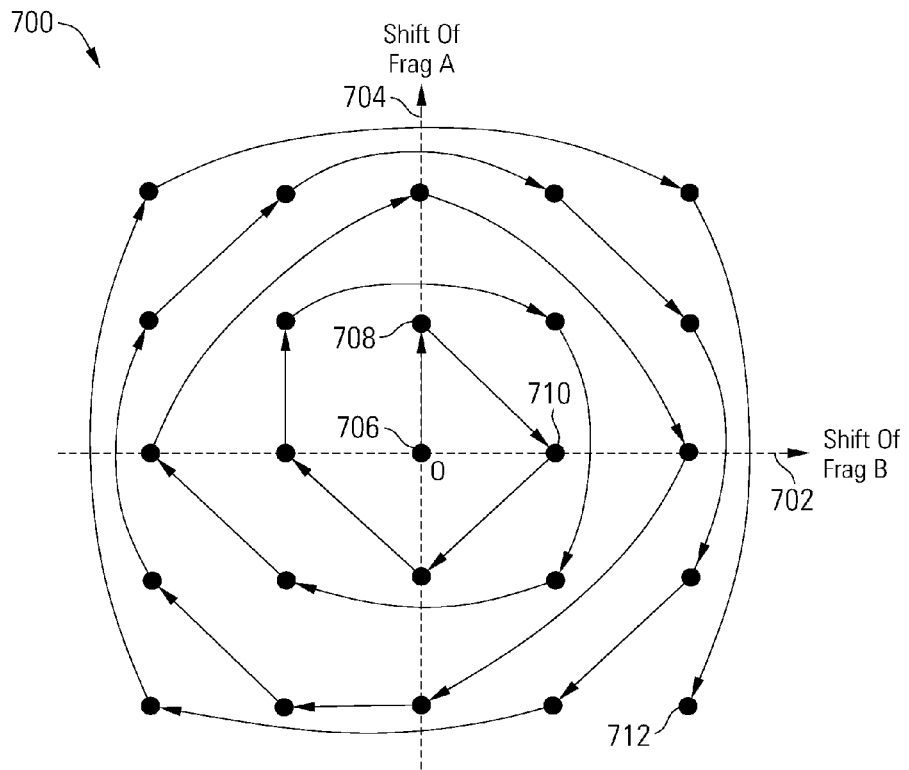
FIG. 7 illustrates data shifts in a two-fragment search for missing syncmarks in accordance with some embodiments of the present invention.

Turning to FIG. 7, the data shifts in a two-fragment search for missing syncmarks are depicted in accordance with some embodiments of the present invention. The syncmark recovery controller 630 can shift data in any number of selected fragments during a single syncmark detection failure recovery operation, changing the shift value of one or more fragments at a time and repeating the detection and decoding. The search pattern 700 illustrates shift values for two fragments, with the shift values of the most likely syncmark positions at the origin 706, and with the search window for fragment A on the Y axis 704 and the search window for fragment B on the X axis 702. The syncmark recovery controller 630 calculates the most likely positions for the initial shift values based on information from the Fragment Information Table 636 as disclosed above, and causes the Y buffer 616 to provide the data sector with the shifted selected fragments to the data detector and decoder 622 for detection and decoding. If the data sector fails to converge in the data detector and decoder 622, the convergence status 626 indicates the failure to the syncmark recovery controller 630. The syncmark recovery controller 630 shifts one or more of the selected fragments, for example changing the shift value of fragment A to the next search position 708 and again causing the Y buffer 616 to provide the data sector with the shifted selected fragments to the data detector and decoder 622 for detection and decoding. If the data still fails to converge, the syncmark recovery controller 630 shifts one or more of the selected fragments, for example changing the shift values of both fragments A and B to the next search position 710. Again, fragments can be shifted one at a time or together. The shifting and processing continues until a shift position 712 is reached that causes the data sector to converge in the data detector and decoder 622, in which case the shift values for the successful shift position 712 are recorded as forced syncmark locations in the Fragment Information Table 636, or until the search windows are unsuccessfully exhausted. Such two-dimensional helical sweeping can be extended to more than two selected fragments, starting with shift values for the most likely syncmark positions and then adjusting the shift values in descending order of probability.

The syncmark detection failure recovery system thus speeds detection of syncmark position for one or more fragments in a data sector, while allowing other retry functions to be applied simultaneously to the data sector.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel syncmark systems and methods for two dimensional magnetic recording and other applications. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for finding a syncmark in a data sector, comprising:

identifying an expected location of a syncmark in each of a plurality of fragments of the data sector;

recording the expected location of the syncmarks;
selecting at least one of the fragments having a lower syncmark quality than others of the plurality of fragments;
sweeping encoded data start points in the selected fragments over search ranges based on the expected syncmark locations for the selected fragments while decoding the data sector; and
recording actual syncmark locations for the selected fragments based on the encoded data start points for which the decoding succeeds.

2. The method of claim 1, wherein the method is performed after a syncmark detection algorithm fails to find at least one of the syncmarks in the data sector.

3. The method of claim 1, wherein the expected location of the syncmarks and the location of the syncmark for the selected fragments are stored in a fragment information table.

4. The method of claim 3, further comprising recording a convergence status for the decoding in the fragment information table.

5. The method of claim 3, further comprising determining the syncmark quality for each of the plurality of fragments and recording the syncmark quality in the fragment information table.

6. The method of claim 1, wherein the encoded data start points are swept for a plurality of selected fragments simultaneously across a set of possible combinations of start points.

7. The method of claim 1, wherein the encoded data start points are swept over the search ranges starting at a center of the search range for each of the selected fragments.

8. The method of claim 1, wherein the encoded data start points are swept over the search ranges starting at centers of the search ranges for the selected fragments.

9. The method of claim 8, wherein the encoded data start points are swept over the search ranges in descending order of probability for the syncmark locations.

10. The method of claim 1, wherein the at least one of the fragments is selected by comparing syncmark quality metrics for the plurality of fragments with a threshold.

11. The method of claim 1, further comprising calculating the expected syncmark locations by averaging distances between a first point when a fragment has been read and a second point when a syncmark has been detected in the fragment for a plurality of neighboring fragments.

12. An apparatus for finding a syncmark in a data sector, comprising:
a syncmark detection circuit operable to detect a syncmark in each of a plurality of fragments of the data sector and to compute a syncmark quality for each of the syncmarks;
a fragment information table operable to store the syncmark quality for each of the syncmarks;
a decoder operable to apply a data decoding algorithm to encoded data for the data sector, the encoded data having startpoints identified by the syncmark in each of the plurality of fragments; and
a syncmark recovery circuit operable to sweep the startpoints over search ranges for selected ones of the plurality of fragments for which the syncmark detection circuit failed to detect the syncmark and which have a lower syncmark quality than others of the plurality of fragments.

13. The apparatus of claim 12, wherein the syncmark recovery circuit is operable to identify the selected ones of the plurality of fragments by comparing their syncmark qualities with a threshold.

14. The apparatus of claim 12, wherein the syncmark recovery circuit is operable to store the startpoints in the fragment information table when the data sector converges in the decoder.

15. The apparatus of claim 12, further comprising a buffer operable to store the plurality of fragments of the data sector in order.

16. The apparatus of claim 15, wherein the syncmark recovery circuit is operable to provide the startpoints of the selected ones of the plurality of fragments to the buffer.

17. The apparatus of claim 12, wherein the decoder comprises a low density parity check decoder.

18. The apparatus of claim 12, wherein the syncmark recovery circuit is operable to calculate the startpoints based on most likely syncmark locations.

19. The apparatus of claim 18, wherein the syncmark recovery circuit is operable to sweep the startpoints in descending order of probability of the syncmark locations.

20. A storage device, comprising:
a storage medium;
a head assembly disposed in relation to the storage medium;
an analog to digital converter circuit connected to the head assembly and comprising a data output;
a syncmark detector connected to the analog to digital converter circuit comprising a syncmark location and quality output;
a fragment information table connected to the syncmark location and quality output;
a syncmark recovery controller connected to the fragment information table;
a buffer comprising a data input connected to the analog to digital converter circuit and a shift input connected to the syncmark recovery controller; and
a data decoder comprising an input connected to a data output of the buffer and a convergence status output connected to the syncmark recovery controller.

* * * * *